US006170292B1

(12) United States Patent
Boulos et al.

(10) Patent No.: US 6,170,292 B1
(45) Date of Patent: Jan. 9, 2001

(54) MEDIUM GRAY COLORED GLASS WITH IMPROVED UV AND IR ABSORPTION AND NITRATE-FREE MANUFACTURING PROCESS THEREFOR

(75) Inventors: Edward Nashed Boulos, Troy, MI (US); James Victor Jones, Toledo, OH (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 09/354,857

(22) Filed: Jul. 29, 1999

Related U.S. Application Data

(62) Division of application No. 09/048,649, filed on Mar. 26, 1998, now Pat. No. 5,977,002.

(51) Int. Cl.⁷ .................................................. C03C 3/087
(52) U.S. Cl. ......................... 65/30.1; 65/134.3; 65/99.2; 501/71; 501/904; 501/905
(58) Field of Search ........................... 501/71, 904, 905; 65/134.3, 30.1, 30.11, 99.2

(56) References Cited

U.S. PATENT DOCUMENTS

| 4,164,545 | * | 8/1979 | Scott | 423/239 |
| 4,341,566 | * | 7/1982 | Barrett et al. | 106/313 |
| 5,278,108 | * | 1/1994 | Cheng et al. | 501/71 |
| 5,346,867 | * | 9/1994 | Jones et al. | 501/71 |
| 5,977,002 | * | 8/1979 | Boulos et al. | 501/71 |

FOREIGN PATENT DOCUMENTS

677492 * 10/1995 (EP).

* cited by examiner

*Primary Examiner*—James Derrington
(74) *Attorney, Agent, or Firm*—Rhonda L. McCoy-Pfau

(57) ABSTRACT

The invention is a medium color gray soda-lime-silica glass composition having excellent ultra violet and infra red absorbing ability. The colorants of the glass composition consist essentially of: greater than 0.5 but less than 0.9 wt. % total iron oxide as $Fe_2O_3$; 0.1 to 1.0 wt. % manganese compound as $MnO_2$; 0.0005 to 0.003 wt. % selenium as Se; 0.002 to 0.010 wt. % cobalt oxide as Co; up to 1.0 $TiO^2$; the glass composition having, at 4.0 mm. thickness: 485–570 dominant wavelength, less than 5% purity of excitation, 35 to 60% light transmittance using Illuminant A, less than 40% ultra violet transmittance measured over 300–400 nm, and less than 45% infra red transmittance measured over 760–2120 nm.

8 Claims, No Drawings

MEDIUM GRAY COLORED GLASS WITH IMPROVED UV AND IR ABSORPTION AND NITRATE-FREE MANUFACTURING PROCESS THEREFOR

This is a divisional of U.S. Ser. No. 09/048,649, filed Mar. 26, 1998 now U.S. Pat. No. 5,977,002.

The invention is directed to a medium gray glass composition having improved UV and IR absorption while maintaining high visible light transmission and which may be manufactured without the use of sodium or potassium nitrate. More particularly, it is a soda-lime-silica glass whose colorants include iron oxide, selenium, manganese oxide, cobalt oxide, and optionally titanium oxide.

BACKGROUND OF THE INVENTION

Gray glass has found particular utility for architectural applications as building glass and has been considered for automotive glass applications. Glass is generally defined by certain spectral properties like dominant wavelength (color), excitation purity, and light transmission. The lower the excitation purity of a color, the closer it is to being a so-called neutral color which does not distort the hues of objects seen through it.

Those skilled in the art know that dominant wave-length, purity and light transmission all vary unpredictably with one another. Consequently, developing a new glass composition having a particular color, purity and light transmission value is generally difficult. For example, an experimental change in the amount or relative proportions of one or more colorants in a glass composition intended to bring one of these numerical values closer to a target value may cause one or both of the other values to drift off target. Hence, the particular portions of the colorants is critical to developing a particular glass composition.

Numerous different patented grey glasses have been manufactured by using as colorants iron oxide, cobalt oxide, and chromium oxide, selenium or nickel oxide. These same colorants have also been used to make glasses of colors other than grey, as would be appreciated however, at least one or more colorants being in different amounts. For example, a brown or bronze glass can be made from iron oxide, cobalt oxide, and selenium, while the glass can be made blue if the proportion of a component, e.g., cobalt is increased. Hence, proportions of colorants is critical to the spectral properties of the glass.

Considering gray glasses, U.S. Pat. No. 4,104,076 discloses a gray glass composition whose colorants consist essentially of: iron oxide, cobalt oxide, and selenium, where to avoid using nickel oxide, either or both chromium oxide or uranium oxide are employed. Cheng in U.S. Pat. No. 5,278,108, in contrast, forms a grey glass with colorants iron oxide, cobalt oxide, and selenium, specifically avoiding constituents that are disclosed to cause difficulty in manufacturing, i.e., chromium and manganese. In U.S. Pat. No. 4,873,206, a dark gray nickel-free glass is manufactured using iron oxide, cobalt oxide, and selenium, therein it is disclosed that the composition is to be essentially free of chromium, titanium, and manganese. Another approach is taken in U.S. Pat. No. 5,346,867, wherein the neutral gray glass is made using the colorants iron oxide, cobalt, selenium, manganese oxide, and optionally titanium oxide. Still another glass is taught in U.S. Patent which uses cerium oxide, iron oxide, selenium, and optionally cobalt oxide, nickel oxide and titanium oxide to obtain a gray color. U.S. Pat. No. 5,656,560 discloses bronze-tinted or grey-tinted glass whose color is obtained by using at least a relatively high amount of manganese oxide, and optionally any of iron oxide, vanadium oxide, nickel oxide, copper oxide, and cobalt oxide. One taught object of this patent is to form its gray or bronze glass without the use of selenium, a very volatile and costly colorant. This last patent, again demonstrates the unpredictable nature of the glass coloring art, where using e.g., iron, manganese, nickel and cobalt results in several example embodiments of a bronze-colored glass.

In the present invention we have developed a new medium grey glass composition, different from those disclosed above, which contains in specified proportions iron oxide, manganese oxide, cobalt oxide, and selenium which provides a glass with excellent ultraviolet (UV) and infrared (IR) absorbing properties and very low excitation purity. This low excitation purity makes the glass ideally suited for both automotive and architectural application since it has a neutral appearance favored by designers. Its excellent UV and IR absorbing properties make it ideally suitable to prevent color fade damage to components inside a car or building and to keep the interiors cool. As would be appreciated, the UV and IR light absorption properties are especially valuable when the glass is for buildings since when heat is absorbed by the glass, the load on building air conditioners is reduced. Therefore, developing a glass with these spectral properties is very important.

Iron oxide exists in two forms in the glass melt, the oxidized form of iron oxide ($Fe_2O_3$) absorbs UV light and the reduced form of iron oxide (FeO) absorbs infra red light. Thus these two forms of iron oxide in the glass lower the UV and IR transmittance through the glass products. Adding iron oxide to a soda-lime-silica glass under normal furnace conditions improves both the UV and the infrared absorption of the glass since the concentration of the iron forms is correspondingly increased. This improvement is at the expense of visible transmittance, however. That is, as iron oxide is added the color of the glass darkens so that the visible transmittance is correspondingly decreased. In the present invention, the incorporation of the particular colorants in combination has been found to allow for improved UV and IR absorbing properties when adding more iron oxide without a commensurate darkening of the glass color. Hence, it retains good visible transmission properties.

SUMMARY OF THE INVENTION

The present invention is a medium gray soda-lime-silica glass composition having excellent ultra violet and infra red absorbing ability. The colorants of the glass composition consist essentially of: greater than 0.5 and less than 0.9 wt. % total iron oxide as $Fe_2O_3$; 0.1 to 1.0 wt. % manganese compound as $MnO_2$; 0.0005 to 0.003 wt. % selenium as Se; 0.002 to 0.010 wt. % cobalt oxide as Co; and optionally up to 1.0 wt. % titanium oxide; the glass composition having, at 4.0 mm. thickness: 485–570 dominant wavelength, less than 5% purity of excitation, 35 to 60% light transmittance using Illuminant A, less than 40% ultra violet transmittance measured over 300–400 nm, and less than 45% infra red transmittance measured over 760–2120 nm. The medium gray composition comprises by weight: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20. The glass may also include tramp materials which sometimes enter the glass with raw materials or as a result of changeover of one glass composition to another in a glass furnace. For example, this would include up to about 0.005 wt. % nickel oxide as NiO.

Advantageously, the glass composition has improved UV and IR absorption and a good shading coefficient, while maintaining good visible light transmittance. And the new invention composition can be manufactured with little or no added sodium or potassium nitrate during melt processing. It has long been taught in the industry that such nitrates are to be added to maintain oxidizing conditions and to decrease the volatilization of selenium. Avoiding the use of nitrates advantageously curtails the production of $NO_x$ emissions from these nitrates.

According to another aspect of the invention, it is a commercially desirable method for manufacturing a gray glass composition without the addition of sodium or potassium nitrate as discussed above and to maintain high visible transmittance while improving the UV and IR absorbing properties. According to this method, additional quantities of iron oxide can be added to improve these properties without the expected commensurate decrease in visible light transmission ordinarily expected. These and other advantages of the present invention will become apparent from the detailed description.

DETAILED DESCRIPTION OF THE INVENTION

Flat soda-lime-silica glass, used in the automotive and architectural industries and conveniently made by the well known float glass process, is generally characterized by the following basic composition shown in Table I, the amounts of the components being based on a weight percentage of the total glass composition:

TABLE I

| Base Glass Components | Weight % |
|---|---|
| $SiO_2$ | 68 to 75 |
| $Al_2O_3$ | 0 to 5 |
| CaO | 5 to 15 |
| MgO | 0 to 10 |
| $Na_2O$ | 10 to 18 |
| $K_2O$ | 0 to 5 |

The medium gray color glass composition of the present invention employs this basic soda-lime-silica glass composition wherein, additionally, CaO+MgO is 6 to 15% and $Na_2O+K_2O$ is 10 to 20%. In addition, the coloring components of the gray glass composition consists essentially of: total iron oxide as $Fe_2O_3$ in an amount of greater than 0.5 and less than 0.9 wt. %, 0.1 to 1.0 wt. % manganese oxide as $MnO_2$, 0.002 to 0.010 wt. % cobalt oxide as Co, and 0.0005 to 0.003 wt. % selenium as Se. Further, the glass considered at a 4.0 mm. thickness has the following spectral properties: 485–570 dominant wavelength, less than 5% purity of excitation, 35 to 60% light transmittance using Illuminant A, less than 40% ultra violet transmittance measured over the range of 300 to 400 nanometers, and less than 45% infra red transmittance measured over the range of 760 to 2120 nanometers.

Generally, as the quantities of the colorants increase, the % LTA, % UV and % IR transmittance will go down. Similarly, as the glass thickness increases for a given glass composition, the transmittance of the thicker glass decreases. Preferably, the dominant wavelength is between 485 and 560 nanometers, more preferably 485 to 520.

As would be known in the art, the materials are mixed and melted together to form the glass. Generally, sheet glass is made according to the well know float glass process. Melting and refining aids are routinely included in glass manufacture and may also be used herein. One refining aid generally used to remove bubbles from the glass is sodium sulfate which results in $SO_3$ in the glass. Preferably $SO_3$ is present in the glass composition at 0.10 to 0.30 wt. %, more preferably 0.14 to 0.25 wt. %.

One required colorant, iron oxide as total iron oxide as $Fe_2O_3$ is present in the invention gray glass composition in quantities in a range of greater than 0.5 but less than 0.9 wt. %, preferably being 0.6 to 0.85 wt. %, more preferably being 0.7 to 0.85 wt. %. All weight percents herein being based on the total weight of the invention glass composition. Typically, this colorant is added into the batch ingredients in the oxide form, $Fe_2O_3$. As discussed above, iron oxide exists in two forms in the glass melt. The oxidized form absorbs UV light and the reduced form absorbs infra red light, hence lowering the UV and IR transmittance through the glass products. Both absorbing functions of the iron oxide are especially valuable when the glass product is used in architectural applications particularly in geographic areas having significant sunshine. The ratio of the reduced iron oxide to the total iron oxide, FeO/total iron as $Fe_2O_2$, is called the redox ratio of the iron oxide. In the present glass it is preferably from 0.18 to 0.29, more preferably being from 0.20 to 0.26. The optimal redox ratio in the final product is determined by the particular spectral properties of the desired glass.

Another essential colorant in the gray glass composition is a manganese compound, such as $MnO_2$. The manganese compound is present in the invention composition in an amount of 0.10 to 1.0 wt. % based on $MnO_2$, more preferably being 0.2 to 0.8 wt. %. This manganese compound can be added to the batch glass components in a variety of forms, for example, but not limited to, $MnO_2$, $Mn_3O_4$, MnO, $MnCO_3$, $MnSO_4$, $MnF_2$, $MnCl_2$, etc. Preferably it is most desirable to use the manganese oxide or manganese carbonate compounds in the batch. As would be appreciated, a mixture of such compounds may also be employed. According to an especially important aspect of the manufacturing process of the present invention gray glass, a naturally occurring mineral, pyrolusite, can be used to supply manganese dioxide to the batch. This mineral is advantageously used because the impurities within the mineral deposits are also those included in the present invention glass such as $Fe_2O_3$, $Al_2O_3$, $SiO_2$, BaO, and CaO. Pyrolusite thus can effectively be used in the batch mixture as the source of manganese oxide and at a significant savings in batch cost.

In the glass composition, this colorant is generally present in the $Mn^{+2}$ and $Mn^{+3}$ state, although it may additionally be present in other states such as $Mn^{+4}$. One form of manganese oxide absorbs in the same area as selenium colorant so that it can desirably be used to replace selenium in providing the desired gray color. Selenium is expensive and easily volatilized from the glass melt. Manganese oxide is inexpensive and not subject to such volatility so that it is optimal as a colorant in the present gray glass composition.

The manganese colorant has oxidizing ability so that when it is added it is able to shift the redox equilibrium of the iron oxide toward its less colored oxidized form. Correspondingly, manganese oxide is converted to the more colorless, reduced MnO. We believe this allows for the improved UV and IR properties without the commensurate reduction in visible transmittance ordinarily expected when more iron oxide is added. Thus while the UV and IR properties might be improved in conventional glass by increasing the iron oxide colorant, if a high visible light transmitting glass were desired, it would not be achieved. Neither the validity nor understanding of this is necessary however for a practice of the invention.

The following example shows the improved properties of the present medium gray invention glass as compared to a conventional gray glass. For example, a conventional gray glass including iron oxide as a colorant ordinarily has a UV transmittance of about 44.4% and an IR transmittance of 53.6% at 56.8% LTA (visible light transmission). A present invention embodiment with a deeper gray color can be made having at almost identical 56.3% LTA, while also exhibiting a significantly improved (i.e., decreased) UV transmittance of only 34.3% and an IR transmittance of only 36.4%. This particular example of a present invention embodiment makes visible the advantage of the present invention glass for architectural applications is apparent.

We have found that when sodium nitrate (or potassium nitrate) used routinely in the glass industry to provide oxidizing conditions to the glass melt is used in the batch, sodium sulfate (a fining agent) must be lowered which may adversely affect the fining action of sodium sulfate. While this invention composition is not required to exclude the use of sodium nitrate, we have found that use of nitrates is less than desirable both from the standpoint of sodium sulfate interaction and nitrogen oxide emissions which may result. Hence, we find that it would be most desirable to limit or exclude the addition of nitrates to the glass melt during glass making processing. We have found that the use of the manganese oxide colorant, which additionally provides oxidizing benefits, allows the elimination of sodium nitrate as a raw material component in the manufacture of the present invention gray glass. Manganese oxide, which we believe aids in adjusting the oxidation state of iron oxide in the glass, also allows the use of anthracite coal to enhance the decomposition of sodium sulfate and improving the fining (removal of gaseous inclusions) characteristics of the glass batch. Normally, one skilled in the art of glass making would not use a batch mixture containing manganese oxide, which has oxidizing properties, together with a reducing agent such as anthracite coal. A key preferred embodiment of the instant invention is combining in the batch manganese oxide with anthracite coal or other like reductants such as graphite, slag from coal fired furnaces, blast furnace slag, coke, or the carbonaceous materials. In theory, increasing manganese oxide will cause the iron oxide equilibrium in the melt to shift toward the oxidized form of the iron while the reductant reacts with the sodium sulfate to decompose into sodium oxide that becomes a part of the glass and sulfur trioxide that provides the fining action at lower temperatures. Sodium sulfate requires higher melting temperatures when a reductant is absent in the batch. The use of a reducing agent in the batch permits lower furnace operating temperatures while making a glass product with the same quality as glass made without the reductant at those higher temperatures. This methodology, we believe, has significant commercial and environmental benefits.

Cobalt is a colorant used in the present invention gray glass composition. It is typically added to the batch ingredients as an oxide thereof, and is present as a coloring component in the glass in an amount of 0.002 to 0.01 wt. % as Co, preferably in an amount of 0.004 to 0.009 wt. %. The cobalt functions to absorb light in the 580 to 680 nanometer range of the visible spectrum. Cobalt has the function of lowering the % LTA and to balance the amount of absorption from Se, $MnO_2$ and both FeO and $Fe_2O_3$ to achieve the desired gray appearance of the present glass composition.

The glass composition also includes selenium in an amount from 0.0005 to 0.003 wt. % as Se which is an essential ingredient for the gray color because selenium has a maximum absorption about 500 nanometers and also combines with iron oxide to form an iron-selenium complex with a stronger absorption peak at about 490 nanometers. As discussed above, manganese oxide in the $Mn^{+3}$ form also has an absorption peak about 490 nanometers so that manganese oxide can partially replace selenium in the composition and provide the absorption needed for the gray color of the glass. Selenium can be added to the glass in a variety of manners including: the elemental metal and in any compound form such as sodium selenite, barium selenite, selenium oxide, sodium selenate, etc.

The present glass composition is able to attain excellent UV properties without the costly additives often used in other glass compositions for this purpose like titanium oxide, chromium oxide, cerium oxide or vanadium pentoxide. However, if desired to increase the UV absorption further, titanium oxide in an amount up to 1.0 wt. % can be added. It is known in the glass industry that titanium dioxide often enters glass compositions as a tramp material or impurity with raw materials when making soda-lime-silica glass compositions, e.g., with the sand, dolomite or limestone. The level of impurity that generally is present ranges normally from about 0.015 to about 0.05 wt. %, depending of the source of the individual raw materials. Thus, typically about 0.02 wt. % of titanium oxide will be present in a manufactured glass even when no titanium oxide has been intentionally added as a colorant to the glass melt.

It is known that tramp materials may also enter the glass batch from changeover of the glass melting furnaces from one composition to another. And the glass composition may also include tramp materials or impurities which often accompany the raw materials used. These tramp materials or impurities are expected to be in small amounts, e.g., up to 0.005 wt. % nickel oxide as NiO. As disclosed by the present inventors in U.S. Pat. No. 5,725,628 inclusion of a manganese compound in glass has been found to reduce nickel sulfide stone formation. Still others tramp materials like chromium, cobalt, which might enter in glass making operation and which may be present in the described invention gray glass will be apparent to those skilled in the art in view of the present disclosure.

The following table lists ingredients which are preferably used to form the embodiments of gray glass compositions according to the present invention.

TABLE II

| BATCH MATERIALS | RANGE MASS (LBS.) |
| --- | --- |
| SAND | 1000 |
| SODA ASH | 290 TO 350 |
| DOLOMITE | 215 TO 260 |
| LIMESTONE | 70 TO 90 |
| SALT CAKE | 6 TO 24 |
| ROUGE (97% $Fe_2O_3$) | 6 TO 13 |
| MANGANESE DIOXIDE | 1.3 TO 13 |
| COBALT OXIDE ($CO_3O_4$) | 0.04 TO 0.19 |
| SELENIUM | 0.05 TO 0.3 |
| CARBOCITE | 0 TO 2 |
| NEPHELINE SYENITE | 0 TO 150 |

The glass is made by mixing and melting the components, and expected to be manufactured according to well known glass making techniques, usually including continuously supplying the components to a melting furnace and heating the materials generally about 1500° C. to make them molten and refining the glass. Then, this molten glass is formed into a glass sheet having a predetermined thickness by a float process or the like. Well known in the industry if the use of the molten tin baths for floating the glass.

It should be noted that all of the glass compositions made in the examples are made according to the preferred invention manufacturing process, i.e., without the use of sodium nitrate as a component. It is unexpected and most desirable that the gray glass composition can be manufactured without the use of the commonly employed oxidant, sodium (or potassium) nitrate, however as discussed above the invention is not so limited. The glass can also be manufactured with the use of nitrates. We believe that the use of the colorant manganese compound allows for the manufacture of the glass without the addition of nitrate since the manganese compound colorant is also able to provide suitable oxidizing conditions. The fact that the manganese compounds like manganese dioxide are relatively inexpensive provides further commercial desirability to the present invention.

Gray glass compositions made according in the present invention can be used for architectural applications or potentially automotive applications. Glasses containing manganese and iron oxides have been known to solarize or discolor when exposed to a strong ultra violet light source. Glasses of the present invention have been found not to experience any appreciable solarization.

The glass of the present invention may also be provided with a coating to vary the spectral properties is as often done in the industry, e.g., to modify the appearance color or vary the reflectance of the glass with materials like chrome, iron, cobalt, or titanium. Still other coatings which may be applied to glass for these purposes would be apparent to those skilled in the art in view of the present disclosure.

Examples of present invention glass composition embodiments were made in the lab according to the following procedure: batches were weighed, placed into a glass jar about 2" high and 2" inside diameter and dry mixed for 10 minutes each on a Turbula mixer, dry batch was placed into an 80% platinum/20% rhodium crucible that stands 2" tall and has an inside diameter at the top of 2.5" and is tapered to the base which has an inside diameter of 1.75". An amount of 4.5 ml. of water is added to the dry batch in the crucible and mixed with a metal spoon. After such preparation, a group of six different batches is melted in a gas/air fired furnace at the same time for 1 hour at 2600° F. and each crucible is removed in turn from the furnace and fritted. Friting the glass involves coating the inside of the platinum/rhodium crucible with the molten glass and then plunging the crucible into cold water.

After removing the crucible from the water and draining the water, the broken glass particles are removed from the sides of the crucible and mechanically mixed inside the crucible. All six samples are fritted in like manner and all crucibles are placed back into the furnace for another 1 hour interval at 2600° F. and the fritting procedure is repeated. After the second fritting process, the crucibles are returned to the furnace for 4 hours at 2600° F. Each crucible is removed in turn from the furnace and each molten glass sample is poured into a graphite mold with an inside diameter of 2.5". Each glass is cooled slowly, labeled, and placed into an annealing furnace where the temperature is quickly raised to 1050° F., held for 2 hours, and then slowly cooled by shutting off the furnace and removing the samples after 14 or more hours. The samples are ground and polished to about 4.0 mm. thickness and subsequently the spectral properties are measured for each sample.

All the laboratory melts made with the above procedure use a base composition of 100 grams sand, 32.22 grams of soda ash, 8.81 grams of limestone, 23.09 grams of dolomite, 1.2 grams of sodium sulfate, 0.075 grams of carbocite, 2.64 grams of nepheline syenite, and the remainder of the batch includes rouge, selenium, manganese dioxide and cobalt oxide in some example melts. Sodium nitrate was not included as a component in any of the examples.

Table III shows the improvement of the ultra violet and infra red absorption of embodiments of present invention glass compositions as the iron oxide is increased and is shifted to its oxidized form by the addition of varying amounts of manganese dioxide. All of the examples display the calculated quantities of each colorant from the batch. For comparison, Example 1 is a commercially made product from Ford Motor Company called Sunglas® Grey. All of the selenium contents of the examples are the target values from batch based on 10 to 20% selenium retention. Iron oxide, manganese dioxide, and cobalt oxide in the examples are also the target values from the batch.

TABLE III

|  | Ex. 1 | Ex. 2 | Ex. 3 | Ex. 4 | Ex. 5 | Ex. 6 | Ex. 7 |
|---|---|---|---|---|---|---|---|
| Wt. % $Fe_2O_3$ | 0.40 | 0.70 | 0.75 | 0.70 | 0.70 | 0.60 | 0.86 |
| Wt. % FeO | 0.096 | 0.160 | 0.163 | 0.158 | 0.151 | 0.135 | 0.242 |
| ppm Se | 13 | 13 | 11 | 20 | 9 | 15 | 7 |
| ppm Co | 56 | 45 | 50 | 45 | 40 | 44 | 42 |
| Wt. % $MnO_2$ | None | 0.2 | 0.2 | 0.2 | 0.2 | 0.2 | 0.2 |
| % LTA | 56.8 | 56.3 | 54.5 | 54.7 | 58.7 | 58.6 | 55.4 |
| % LTC | 56.8 | 57.1 | 55.3 | 55.3 | 59.5 | 59.4 | 56.5 |
| % UV | 44.4 | 34.3 | 32.3 | 32.7 | 35.8 | 38.5 | 31.6 |
| % IR | 53.6 | 36.4 | 31.9 | 36.5 | 34.4 | 41.9 | 20.2 |
| % TSET | 55.3 | 44.0 | 42.7 | 43.3 | 46.1 | 48.5 | 36.7 |
| Dominant Wavelength | 467.2 | 493.7 | 493.8 | 500.3 | 492.2 | 489.9 | 496.5 |
| % Excitation Purity | 0.5 | 2.7 | 2.7 | 1.6 | 2.9 | 3.2 | 3.3 |

From Table III, it can be readily seen that the addition of manganese dioxide together with the increased iron oxide significantly improves both the ultra violet and infra red absorption of the present invention gray glass composition embodiments as shown in table examples. Most desirably, in addition to the significant improvement in the ultra violet absorption of the glass, the invention also can achieve essentially the same visible transmittance of the glass, as evidenced by % LTA. Examples 2 through 7 shows the improvement in ultra violet and infra red absorption while maintaining a similar transmittance to the commercial product. Note also in Example 7 that the iron oxide is significantly increased over that of the commercial product in Example 1 with little loss of visible transmittance.

Table IV shows other examples of glasses where the ultra violet and infra red absorption has been improved. In Tables III, IV, and V no $TiO_2$ was added to the glass, but it was present as an impurity in the glass at a level of about 0.02 wt. %, having come in with raw materials.

TABLE IV

|  | Ex. 8 | Ex. 9 | Ex. 10 | Ex. 11 | Ex. 12 | Ex. 13 |
|---|---|---|---|---|---|---|
| Wt. % $Fe_2O_3$ | 0.89 | 0.89 | 0.65 | 0.89 | 0.86 | 0.60 |
| Wt. % FeO | 0.200 | 0.190 | 0.145 | 0.169 | 0.217 | 0.137 |
| ppm Se | 17 | 11 | 13 | 11 | 11 | 14 |
| ppm Co | 85 | 65 | 61 | 95 | 42 | 60 |
| Wt. % $MnO_2$ | 0.3 | 0.3 | 0.2 | 0.8 | 0.2 | 0.2 |
| % LTA | 38.7 | 46.7 | 52.8 | 36.5 | 53.4 | 54.5 |
| % LTC | 39.0 | 47.4 | 53.6 | 36.6 | 54.6 | 55.4 |
| % UV | 20.5 | 24.3 | 34.7 | 14.5 | 30.7 | 37.7 |
| % IR | 25.1 | 26.7 | 35.5 | 30.1 | 22.9 | 41.5 |
| % TSET | 31.8 | 36.3 | 44.3 | 33.3 | 37.3 | 46.9 |
| Dominant Wavelength | 519.4 | 495.8 | 487.5 | 561.6 | 493.0 | 485.9 |
| % Excitation Purity | 1.0 | 2.8 | 4.1 | 4.1 | 4.2 | 4.7 |

The results of Table IV, for present invention glass composition embodiments, demonstrate again that increasing the $Fe_2O_3$, correspondingly increases the ultra violet absorption. Table IV also shows that at as the concentration of $MnO_2$ is increased, the ultra violet absorption is further increased by a significant amount. As both manganese oxide and iron oxide is increased, the infra red absorption is also improved while maintaining the gray color.

Table V further demonstrates the ultra violet absorption and infra red improvements attained when $MnO_2$ and $Fe_2O_3$ are steadily increased in invention example embodiments.

TABLE V

|  | Ex. 14 | Ex. 15 | Ex. 16 | Ex. 17 | Ex. 18 | Ex. 19 |
|---|---|---|---|---|---|---|
| Wt. % $Fe_2O_3$ | 0.58 | 0.75 | 0.89 | 0.80 | 0.89 | 0.89 |
| Wt. % FeO | 0.165 | 0.159 | 0.184 | 0.143 | 0.186 | 0.163 |
| ppm Se | 14 | 11 | 11 | 6 | 17 | 6 |
| ppm Co | 51 | 50 | 65 | 60 | 90 | 80 |
| Wt. % $MnO_2$ | 0.1 | 0.3 | 0.4 | 0.8 | 0.4 | 0.8 |
| % LTA | 55.0 | 53.5 | 43.8 | 48.4 | 36.6 | 43.7 |
| % LTC | 55.8 | 54.2 | 44.5 | 48.7 | 36.6 | 44.3 |
| % UV | 36.7 | 30.4 | 22.5 | 20.7 | 17.8 | 18.2 |
| % IR | 31.6 | 32.6 | 27.7 | 35.9 | 27.3 | 31.6 |
| % TSET | 43.3 | 42.6 | 35.6 | 41.6 | 31.9 | 37.4 |
| Dominant Wavelength | 486.6 | 498.7 | 495.3 | 556.8 | 567.6 | 514.6 |
| % Excitation Purity | 4.2 | 1.9 | 2.7 | 3.6 | 3.9 | 1.6 |

Example 17 from Table V represents an important embodiment of the present invention wherein the manganese dioxide has been increased, the glass has remained gray color, evidenced by the low % excitation purity, and both the ultra violet and infra red absorption has steadily been improved. Note also that manganese dioxide can replace some of the selenium as in Examples 17 and 19 while maintaining the gray color.

While certain preferred embodiments of the invention have been described above, it is expected that other variation as are known to those skilled in the art may be resorted to without departing from the scope of the invention as defined by the claims that follow.

We claim:

1. A method for manufacturing a medium gray glass composition from raw materials comprising by weight: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%; and colorants consisting essentially of: total iron oxide as $Fe_2O_3$ in an amount greater than 0.5 and less than 0.9%; 0.1 to 1.0% manganese oxide as $MnO_2$; 0.002 to 0.010% cobalt oxide as Co; and 0.0005 to 0.003% selenium; the glass having at a 4.0 mm thickness: 485–570 dominant wavelength, less than 5.0% purity of excitation, less than 40% ultraviolet transmittance measured over 300–400 nm, less than 45% infra red transmittance measured over 760–2120 nm, with 35–58.7% light transmittance using Illuminant A, wherein said method comprises the steps of mixing and melting the raw materials suitable to manufacture the glass composition.

2. The method according to claim 1, wherein the dominant wavelength is between 485 and 560 nanometers.

3. The method according to claim 1, wherein the amount of said total iron expressed as $Fe_2O_3$ is within the range of 0.6 to 0.85%.

4. The method according to claim 1, wherein the amount of manganese compound expressed as $MnO_2$ is 0.2 to 0.8%.

5. The method according to claim 1, wherein the amount of said total iron expressed as $Fe_2O_3$ is within the range of 0.7 to 0.85%.

6. The method according to claim 1, wherein the amount of said cobalt oxide as Co is within the range of 0.004 to 0.009%.

7. The method according to claim 1, wherein the method further comprises using pyrolusite as a source of the manganese oxide.

8. The method according to claim 1, wherein the method further comprises using during the processing a reductant as a raw material component.

* * * * *